United States Patent Office 3,793,410
Patented Feb. 19, 1974

3,793,410
INJECTION MOULDING PROCESS
Paul Johnson Garner, Thorpe Bay, England, assignor to Imperial Chemical Industries Limited, London, England
Original application Feb. 2, 1970, Ser. No. 7,865. Divided and this application Sept. 7, 1972, Ser. No. 286,945
Claims priority, application Great Britain, Feb. 2, 1969, 8,714/69
Int. Cl. B29d 27/02
U.S. Cl. 264—45
9 Claims

ABSTRACT OF THE DISCLOSURE

Injection moulding process wherein a skin material and then a core material are sequentially injected into a mould cavity and then a tap operated to prevent further injection to give an article having a skin of one material enclosing a core of a dissimilar material. In order to avoid hesitation marks on the moulding, injection of the core material is commenced before injection of skin material is completed. Preferably, a pressure operated shuttle valve controlled by the relative pressures in the two polymer streams is used to select which composition is injected.

---

This application is a divisional continuation-in-part application of my application Ser. No. 7,865 filed Feb. 2, 1970, now Pat. No. 3,690,797.

This invention relates to injection moulding and in particular to the production of injection moulded articles having a skin of synthetic resin material, enclosing a core of dissimilar synthetic resin material at all points away from the sprue area of the moulding, i.e. the area corresponding to the position or positions wherein the materials are injected into the mould cavity.

Such articles may be made, as is described in U.S. Pat. 3,599,290, by sequentially injecting the skin and core materials into a mould cavity through a common sprue channel so that the core material is injected to within the skin material and extends the latter to fill the mould cavity.

In order to achieve rapid moulding cycles it is desirable that the mould cavity walls are heated or cooled, as appropriate, to enhance solidification of the synthetic resin material. Thus where the synthetic resin materials are thermoplastics that are solidified by cooling, the mould walls are preferably cooled, e.g. by water circulating within the mould members defining the mould cavity, while, where the synthetic resin materials are thermosetting, i.e. materials that are converted to the solidified state by heating, the mould walls are preferably heated.

On injection of the synthetic resin materials into the mould cavity, the material adjacent the walls solidifies before that in the centre of the cavity. As the material is injected into the mould cavity, it contacts the mould wall and then spreads out from the injection orifice, herein termed sprue channel, towards the mould extremities. Thus while material is being injected, the melt front is continuously moving until it is halted by contact with the mould wall. I have noticed that if the melt front temporarily stops moving and is not in contact with the mould wall, a line may appear on the surface of the moulded article at a point corresponding to the position of the melt front where it was temporarily halted. This line is believed to be caused by preferential solidification of the melt at the point where the melt front is stationary. Some materials exhibit this line, herein termed a hesitation mark, to a greater extent than other materials.

During the injection cycle it is necessary to inject different materials, i.e. the skin material and then the core material, and so it is necessary to switch from injection of one material to another. While it is possible to arrange that the switchover is very rapid nevertheless a hesitation mark is still liable to occur. I have found that if the switching of the supplies is arranged such that injection of the core material commences before injection of the skin material ceases such hesitation marks may be avoided.

Accordingly I provide a process for moulding a laminar article having a skin of one injection mouldable synthetic resin composition substantially enclosing a core of a different synthetic resin composition comprising injecting the skin forming composition from a source of that composition into a mould cavity via a sprue channel and then, before injection of the skin composition has finished, commencing injection of the core forming composition from a source of that composition into the mould cavity through said sprue channel, the passages of said skin and core compositions from their sources to said sprue channel being separate, stopping the injection of the skin composition and continuing injection of the core composition, and after the desired amount of the core composition has been injected, operating a tap, immediately adjacent the sprue channel and at the outlet of which tap the passages of the skin and core compositions merge, to prevent injection from either source into the mould cavity, and maintaining the injected compositions in the mould cavity until they have solidified. In order to minimize mixing of the compositions, the switching of the supplies is preferably very rapid so that the period when both compositions are being injected is very small. Furthermore as it takes an appreciable time to bring the materials to the injection pressure, it is desirable that the source of the core composition can be raised to the desired pressure, and/or maintained at that level, while the skin composition is being injected.

This may be achieved by providing a valve member, which is preferably a shuttle, operative to close one or other of the passages intermediate the sources and the sprue channel, said valve member being responsive to the forces exerted thereon by the compositions in the passages upstream of the valve member so that the force exerted on the valve member by the composition in one passage upstream of the valve member urges the valve member to close the other passage, and vice versa. Switchover from injection of skin composition to injection of core composition is achieved by increasing the pressure on the core composition in its source until the force it exerts upon the valve member is sufficient to urge the valve member to move to close the passage from the source of the skin composition and to open the passage from the source of core composition.

Where the valve member is a shuttle arranged to slide transverse to the passages, it may be further arranged such that, when the shuttle is at either end of its travel, the projected area of the shuttle on which the pressure of the composition upstream of the shuttle in that passage closed by the shuttle acts to urge the shuttle to the other extremity of its travel is a fraction of the projected area on which the pressure of the composition in the other passage acts to hold the shuttle in the position wherein said closed passage is closed. In this case switchover is achieved by increasing the pressure on the composition upstream of the shuttle in the closed passage to sufficiently above the pressure on the composition in the other passage to cause the force exerted on the lesser projected area to exceed the force on the projected area of the shuttle in the other passage.

The projected areas of the shuttle are the areas of the end of the shuttle projected on to a plane perpendicular to the direction of movement of the shuttle.

As the pressure of the composition upstream of the shuttle in the closed source is increased, at some pressure, dependent on the value of said fraction, above the pressure of the composition in the source that is open, the force on the projected area of the end of the shuttle at the end closing the closed source exceeds that on the projected area of the end of the shuttle exposed to the open source. At this stage the shuttle starts to move to close the open source and to open the closed source. As soon as the closed source is partially opened, the composition from the closed source can flow past the end of the shuttle into the sprue and so the pressure of the composition in the closed source acts over the entire area of the end of the shuttle.

The force on the entire area of the end of the shuttle that closed the closed source will be well in excess of the force on the other end of the shuttle and so the shuttle will move rapidly, closing the open source.

It is seen that not only is the switching of supplies of material from the two sources rapid but also, for a very short time, both compositions will be injected from the sources into the sprue channel. Thus little or no hesitation of the advancing front of the skin composition in the mould will occur.

It will be appreciated that the amount by which the pressure in the source closed by the shuttle can exceed that in the open source will depend inversely on the proportion of the projected area of the shuttle acted upon by the composition in the closed source so as to force the shuttle to the open position to the projected area of the other end of the shuttle acted upon by the composition in the open source. The actual proportion utilized will of course be determined by the desired excess of pressure. I prefer however that the projected area of the end of the shuttle acted upon by the composition in the closed source is between 20 and 80%, preferably about 50%, of the projected area acted upon by the composition in the open source.

Throughout the present specification, the term "sprue channel" is used to describe the channel extending from the point where the two sources of material join to the mould cavity.

The present invention is particularly, but not exclusively, applicable to the production of articles having a foamed core and unfoamed surface layers. These articles may be produced by first injecting an unfoamable composition into the mould and subsequently injecting a foamable composition, which is then allowed to foam in the mould. The unfoamable composition thus provides the surface skin of the article and the foamable material the core.

Conveniently, these articles may be made in an injection moulding machine having two injection barrels each of which constitutes a source of material. Thus, using an injection moulding machine according to the present invention to make a foam cored articles, at the start of a moulding cycle the pressure in the injection barrel containing the unfoamable composition is greater than that in the barrel containing the foamable composition so that the shuttle is open to the unfoamable composition but closed to the foamable composition. While the desired amount of unfoamable composition is being introduced into the sprue channel and mould cavity, the pressure on the foamable composition is increased to a point where the force on the projected area of the shuttle exposed to the foamable composition is greater than the force on the projected area of the shuttle exposed to the unfoamable composition when the desired amount of unfoamable composition has been introduced. The shuttle then slides to block off the supply of the unfoamable composition and allow the foamable composition to be injected into the mould. It will be appreciated that, while the shuttle is in its intermediate positions, both compositions will be injected: i.e., injection of the foamable composition commences before injection of the unfoamable composition is complete. When the desired amount of the foamable composition has been injected, the tap is closed to prevent further injection and the foamable material is then allowed to foam within the mould. This foaming may be permitted either by injecting only an amount of material into the mould that is insufficient to fill the mould so that the mould will only be filled when foaming has taken place or alternatively, the amount of the foamable composition injected be such that the mould is filled without any foaming taking place and then the mould cavity is enlarged subsequent to the injection to provide room for the foamable composition to expand. The mould may be enlarged mechanically or solely by the pressure generated by the composition of the blowing agent, whichever is convenient.

In a preferred method of operating a machine according to the present invention which is especially useful in the production of laminar articles having a foamed core with unfoamed surface skins, a second charge of the skin composition is injected after the core composition before the tap is closed to prevent further injection. As before, injection of the further charge of the skin composition is preferably commenced before injection of the core composition is finished. Where a shuttle valve is used, this method may conveniently be achieved by adjusting the pressures on the compositions in their sources so that the force exerted on the shuttle by the skin composition urges the shuttle to move to close the passage from the source of core composition and to open the passage from the source of skin composition. Thus, when the pressure on the skin composition becomes sufficiently large, the shuttle will slide to block off the core composition and allow more skin composition into the mould. The purpose of introducing a second charge of skin composition is twofold. Firstly, the further injection of skin composition sweeps out any core composition that may have entered the skin composition passage during the period when both were injected together and so ensures that, at the start of the next injection cycle, no core composition, which might mar the surface finish of the article, will contaminate the skin composition injected in that next cycle.

Generally essentially all the material in the sprue channel, i.e., downstream of the tap, will be solidified and removed as a sprue on the moulding, and the further injection of the skin composition ensures that any material remaining in the sprue channel on removal of the moulding will be skin material and hence not liable to mar the surface finish of the moulding of the next moulding cycle. The second purpose of the second charge of skin composition is that it ensures that, when the material that was in the sprue channel during moulding and is attached to the moulding when it is removed from the mould is cut away from the moulding, skin composition and not core composition is exposed.

My preferred form of valve is formed in a single block of metal through which the compositions from the two sources may flow along separate, substantially parallel bores. The sliding shuttle may then conveniently be mounted in a channel joining the two bores in a direction transverse to their axes; the length of the shuttle must be greater than the width of the individual bores and so shaped that it will completely seal off each bore from the mould when it is forced into that bore by the higher pressure in the other bore. Conveniently, the end of the shuttle nearest the sources is tapered so that the force of the composition on this tapered surface acts to urge the shuttle into the other bore. The two bores preferably converge into a single sprue channel at only a short distance beyond the sliding shuttle: i.e. the tap is preferably situated immediately beyond the shuttle. The longer the bore beyond the shuttle the greater is the risk that the compositions in the two bores will mix. The shuttle may conveniently be formed in the barrel end cap of a moulding machine or may be formed in the fixed platen of the machine or in a block attached to the fixed platen or in the mould itself. In my preferred machine the shuttle is formed in the barrel end cap of a moulding machine consisting of two injection barrels which for space saving reaons are preferably parallel to each other.

The present invention is particularly applicable to the injection moulding of any injection mouldable thermoplastic composition although it may be used for injection mouldable thermosetting compositions. The compositions from the separate sources may be the same or different as the case may be. Although the use of machines according to this invention has been described with particular reference to the injection moulding of articles having a foamed core and an unfoamed skin, the invention is in no way limited to the production of such articles. For example, it may be used to produce laminar articles from two different materials or two different colors of the same or different materials.

The timing of the operation of the machine according to the present invention must be synchronised so that the various operations involved take place at the correct time. Thus, firstly the mould is closed ready for the introduction of the moulding compositions, pressure is then applied to the skin composition which is to be injected into the mould first so that the shuttle is open to the source of the skin composition; the pressure on the core composition in its source is then increased while the skin composition is being injected into the mould so that when the required quantity of the skin composition has been injected into the sprue channel, the pressure on the core composition is such that the force on the projected area of the shuttle acted upon by the core composition is greater than the force on the projected area of the shuttle acted upon by the skin composition so that the shuttle slides to allow the core composition to pass into the mould and to cut off the supply of the skin composition. Thereafter the pressures are adjusted to allow a further charge of skin composition if this is required and then the tap closed to prevent further injection. Finally, if necessary, the mould is enlarged to allow any foaming to take place and then the injected compositions allowed to solidify; the mould is then open and the moulding removed. The cycle may then be repeated.

One particular advantage of the process of the present invention is that while one composition is being injected into the mould the pressure on the composition which is to be next injected may be increased so that as soon as the required amount of one composition has been injected, the pressure on the other composition causes the shuttle to slide and the second composition to be injected into the mould. Thus, it is possible to maintain an almost constant flow of material into the mould.

The present invention is illustrated but in no way limited by reference to the accompanying drawings, in which.

Figure 1:
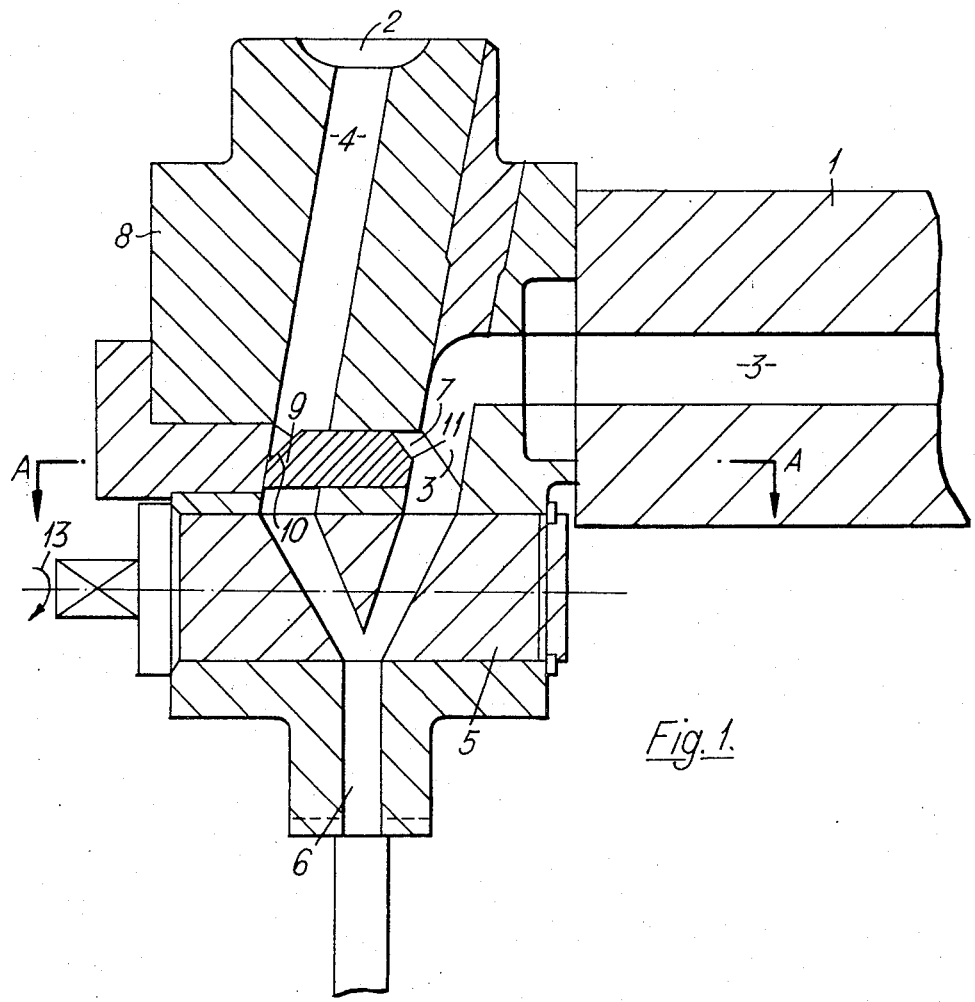
FIG. 1 is a section through the part of an injection moulding machine containing a valve according to the present invention.

With reference to FIG. 1, polymer flows from the barrels of two injection moulding units, the ends of which are shown at 1 and 2. The compositions flow from the moulding units along passages 3 and 4 which converge in the shut-off tap spigot 5 of the machine and then flow along the sprue channel 6 into the mould (not shown). A slideway 7 joining the passages 3 and 4 is formed within the valve body 8 and a sliding shuttle 9 is provided which is a close fit within the slideway 7. The end of the shuttle 9 which is exposed to the composition upstream of the shuttle in passage 4 is tapered as shown at 10 to provide a surface which, when acted on by the force of the composition in passage 4 upstream of the shuttle 9 will tend to urge the shuttle 9 into the passage 3.

It will be seen that in the drawing, the tapered portion 10 corresponds to approximately half the thickness of the shuttle 9. When the shuttle is in the position shown in FIG. 1, the composition in passage 4 exerts a force on the tapered portion 10 urging the shuttle towards passage 3. However since the projected area acted upon by the composition in passage 4 upstream of shuttle 9 is only about half the area of that acted upon by the composition in passage 3, the shuttle remains in position until the pressure in passage 4 is about twice that in passage 3. When the pressure in passage 4 exceeds this figure, the shuttle starts to move, thereby permitting the composition to flow through passage 4 into the sprue channel 6. The whole of the end of the shuttle in passage 4 is thus now exposed to the pressure of the composition in passage 4 so that the shuttle moves rapidly into passage 3 to close passage 3 as the force urging it there is about twice that acting on the end of the shuttle in passage 3. While the shuttle is in transit, the compositions will flow through both passage 3 and passage 4 so that no interruption of flow occurs. Similarly, the end of the shuttle exposed to the composition in the passage 3 upstream of the shuttle is cut away as is illustrated at 11 so that forces acting thereon urge the shuttle into the passage 4. The shut-off tap 5 is rotatable within the valve housing 8 as illustrated by the arrow 13 and may thus be rotated so as to isolate the sprue channel 6 from the passages 3 and 4 so as to prevent further injection.

Figure 2:
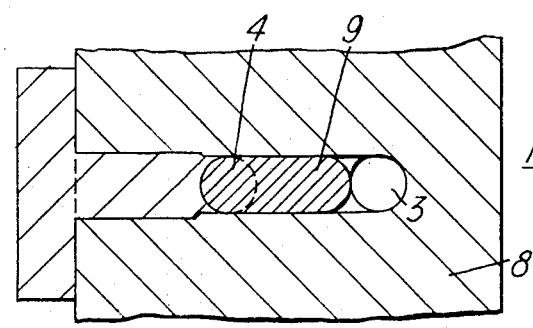
FIG. 2 is a section taken on AA' of FIG. 1.

FIG. 2, which is a cross-section of AA' of FIG. 1, illustrates the shape of the shuttle 9 demonstrating that when it is forced into one of the passages it forms a seal within the passage.

I claim:

1. A process for moulding a laminar article having a skin of one injection mouldable synthetic resin composition substantially enclosing a core of a different synthetic resin composition comprising injecting the skin forming composition from a source of that composition into a mould cavity via a sprue channel and then, before injection of the skin composition has finished, commencing injection of the core forming composition from a source of that composition into the mould cavity through said sprue channel, the passages of said skin and core compositions from their sources to said sprue channel being separate, stopping the injection of the skin composition and continuing injection of the core composition, and, after the desired amount of the core composition has been injected, operating a tap, immediately adjacent the sprue channel and at the outlet of which tap the passages of the skin and core compositions merge, to prevent injection from either source into the mould cavity, and maintaining the injected compositions in the mould cavity until they have solidified.

2. A process as claimed in claim 1 wherein a valve member operative to close one or other of the passages is provided intermediate the sources and the sprue channel, said valve member being responsive to the forces exerted thereon by the compositions in the passages upstream of the valve member so that the force exerted on the valve member by the composition in one passage upstream of the valve member urges the valve member to close the other passage, and vice versa, and wherein the switchover from injection of skin composition to injection of core composition is achieved by increasing the pressure on the core composition in its source until the force it exerts upon the valve member is sufficient to urge the valve member to move to close the passage from the source of the skin composition and to open the passage from the source of core composition.

3. A process as claimed in claim 1 wherein, before injection of the core composition has finished, commencing injection of a second charge of the skin composition, stopping injection of the core composition, continuing injection of the skin composition, and, when the desired amount of the second charge of skin composition has been injected, operating the tap to prevent injection from either source.

4. A process as claimed in claim 2 wherein a second charge of the skin composition is injected after the core composition and switchover from injecting the core composition to injecting the skin composition is achieved by adjusting the pressures on the compositions in their sources during injection of the core composition so that the force exerted on the valve member by the skin composition urges the valve member to move to close the passage from the source of the core composition and to open the passage from the source of skin composition, and, when the desired amount of the second charge of skin composition has been injected, operating the tap to prevent injection from either source.

5. A process as claimed in claim 2 wherein the valve member is a shuttle which is slidably mounted transverse to the passages and, when the shuttle is at either end of its travel, the projected area of the shuttle on which the pressure of the composition upstream of the shuttle in that passage closed by the shuttle acts to urge the shuttle to the other extremity of its travel is a fraction of the projected area on which the pressure of the composition in the other passage acts to hold the shuttle in the position wherein said closed passage is closed, and switchover is achieved by increasing the pressure on the composition upstream of the shuttle in the closed passage to sufficiently above the pressure on the composition in the other passage to cause the force exerted on the lesser projected area to exceed the force on the projected area of the shuttle in the other passage.

6. A process as claimed in claim 1 wherein, after closing the tap, the injected compositions in the mould cavity and sprue channel are solidified and then the moulded article is removed from the mould cavity together with the solidified compositions in the sprue channel.

7. A process according to claim 1 in which the core composition is foamable and is allowed to foam within the mould.

8. A process according to claim 7 in which the core composition is injected into the mould at a temperature above its normal foaming temperature.

9. A process according to claim 8 in which the compositions are injected under such pressures that the mould cavity is filled before any foaming takes place and the volume of the mould cavity is subsequently enlarged to allow foaming.

References Cited
UNITED STATES PATENTS

| | | | |
|---|---|---|---|
| 3,599,290 | 8/1971 | Garner | 264—328 XR |
| 3,221,373 | 12/1965 | Kwan | 264—250 XR |
| 3,158,901 | 12/1964 | Westover | 425—378 XR |
| 2,936,489 | 5/1960 | Sherman | 264—255 XR |
| 2,710,987 | 6/1955 | Sherman | 264—255 XR |

ROBERT F. WHITE, Primary Examiner

R. R. KUCIA, Assistant Examiner

U.S. Cl. X.R.

264—250, 255, 329

UNITED STATES PATENT OFFICE
CERTIFICATE OF CORRECTION

Patent No. 3,793,410        Dated February 19, 1974

Inventor(s) P. J. Garner

It is certified that error appears in the above-identified patent and that said Letters Patent are hereby corrected as shown below:

Column 1, in the priority data, "Feb. 2, 1969" should be --Feb. 18, 1969--.

Claim 1, column 6, line 41, the period (.) after "merge" should be a comma (,).

Signed and sealed this 3rd day of December 1974.

(SEAL)
Attest:

McCOY M. GIBSON JR.
Attesting Officer

C. MARSHALL DANN
Commissioner of Patents